(12) United States Patent
Chen

(10) Patent No.: US 10,082,783 B2
(45) Date of Patent: Sep. 25, 2018

(54) COMPUTER NUMERICAL CONTROL SERVO DRIVE SYSTEM

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 256 days.

(21) Appl. No.: 14/972,567

(22) Filed: Dec. 17, 2015

(65) Prior Publication Data
US 2017/0176972 A1 Jun. 22, 2017

(51) Int. Cl.
*G05B 19/404* (2006.01)

(52) U.S. Cl.
CPC .. *G05B 19/404* (2013.01); *G05B 2219/34429* (2013.01)

(58) Field of Classification Search
CPC ........ G05B 19/404; G05B 2219/34429; B24B 49/02; B24B 49/14
USPC ........................................................ 700/275
See application file for complete search history.

(56) References Cited

U.S. PATENT DOCUMENTS

| | | | | |
|---|---|---|---|---|
| 4,283,159 A * | 8/1981 | Johnson | .............. | E21B 43/0122 166/364 |
| 6,386,008 B1 * | 5/2002 | Virtanen | .................. | B21D 5/02 72/19.8 |
| 9,201,418 B1 * | 12/2015 | Chiu | ................... | G05B 19/4144 |
| 2001/0012972 A1 * | 8/2001 | Matsumoto | ........ | G05B 19/4166 700/160 |
| 2003/0009260 A1 * | 1/2003 | Tanaka | ................... | B25J 9/1651 700/245 |
| 2009/0309529 A1 * | 12/2009 | Shoda | ....................... | H02P 5/68 318/490 |
| 2010/0145515 A1 * | 6/2010 | Nakanishi | .............. | B25J 9/1676 700/255 |
| 2010/0191365 A1 * | 7/2010 | Yonezu | .................. | B23Q 17/22 700/174 |
| 2017/0129729 A1 * | 5/2017 | Chen | ...................... | B65H 20/18 |

* cited by examiner

*Primary Examiner* — Nathan L Laughlin
*Assistant Examiner* — Santosh R Poudel
(74) *Attorney, Agent, or Firm* — Leong C. Lei

(57) ABSTRACT

A computer numerical control (CNC) servo drive system includes a controller, a driver, a co-connection circuit, a first servo motor and a second servo motor. Users input a control command through the controller. The driver is connected to the controller, converts the control command into a drive signal, and outputs the drive signal. The co-connection circuit is connected to the driver and transmits the drive signal. A sum of maximum current values of the first servo motor and the second servo motor is not greater than a maximum current value of the driver, such that the driver can simultaneously drive the first servo motor and the second servo motor for operation.

2 Claims, 6 Drawing Sheets

COMPUTER NUMERICAL CONTROL SERVO DRIVE SYSTEM

BACKGROUND OF THE INVENTION

1. Field of the Invention

The present invention relates to a computer numerical control (CNC) servo drive system and, more particularly, to a system capable of simultaneously driving multiple servo motors through a controller and a driver.

2. Description of the Related Art

Servo motors of CNC servo drive systems can perform accurate control over location and motion thereof, such as rotation speed, fast switch of forward and reverse rotation, accurate positioning and the like, and are oftentimes applied to automation of numerically controlled processes in car industry or for metal working machines. The working concepts of the CNC servo drive system reside in that users input a command to a controller, and after compilation of the command, control information is transmitted to a driver for the driver to drive a servo motor to perform motion, such as moving a tool, cutting or milling a workpiece with a tool, and the like, according to the control information.

With reference to FIG. 6, a conventional CNC servo drive system 90 includes a control box 91 and machining equipment 92. The control box 91 is normally a controller 911 in connection with three drivers 912 for the purpose of providing driving signals. The machining equipment 92 includes three servo motors 921 respectively responsible for machining processes in X axis, Y axis and Z axis. When each driver 912 is connected to one of the servo motors 921, the operating time of the servo motor 921 at a highest rotation speed is quite short. The servo motor 921 is only operated with a maximum current upon start, instantaneous acceleration and instantaneous stop of the servo motor 921, and the operation time for the servo motor 921 to maintain at those operation states is not a long period but in merely approximately 1 to 3 seconds. During the rest of operation, the rotation speed of the servo motor 921 is normally low (rated rotation speed) so that the load current of the servo motor 921 is relatively small with a current value being 30% of current required by the drivers 912 regularly and 10% for a lowest current condition. As can be seen from the operation of the servo motor 921, a significant amount of current is not effectively utilized. In case of mass production, not only may human errors arise from the necessity of inputting control commands to each control box 91, but the equipment cost is unable to be effectively lowered since the control box 91 can just control the single one piece of machining equipment.

SUMMARY OF THE INVENTION

An objective of the present invention is to provide a computer numerical control (CNC) servo drive system utilizing a co-connection circuit for a driver to simultaneously drive multiple servo motors, thereby enhancing power utilization efficiency and reducing equipment cost.

To achieve the foregoing objective, the CNC servo drive system includes a controller, a driver, a co-connection circuit, and multiple servo motors.

The controller is adapted to receive a user-inputted control command, converts the control command into a control signal, and outputs the control signal.

The driver is connected to the controller and performs and converts the control signal to output a drive signal.

The co-connection circuit is connected to the driver and transmits the drive signal.

The multiple servo motors are connected to the co-connection circuit and make motion according to the drive signal.

A sum of maximum current values of the multiple servo motors is not greater than a maximum current value outputted from the driver.

Given the foregoing design of the co-connection circuit, the CNC servo drive system can utilize a driver to simultaneously drive the first servo motor and the second servo motor. Thus, users' control commands can be simultaneously performed by using a controller to connect to two machine tools for synchronous machining in favor of processes for mass production. The first servo motor is connected to the driver through the feedback line and transmits operation information of the first servo motor, such as motor position, moving speed or positioning accuracy, for the controller to get the hold of the operation information of the first servo motor and modify the control command so as to synchronously drive the second servo motor for operation. The second servo motor can be further connected to a switch for users to directly turn on/off or pause the second servo motor through the switch. Accordingly, power utilization efficiency and machining effectiveness can be enhanced and equipment cost can be reduced through the use of the CNC servo drive system.

Other objectives, advantages and novel features of the invention will become more apparent from the following detailed description when taken in conjunction with the accompanying drawings.

DETAILED DESCRIPTION OF THE INVENTION

Figure 1:
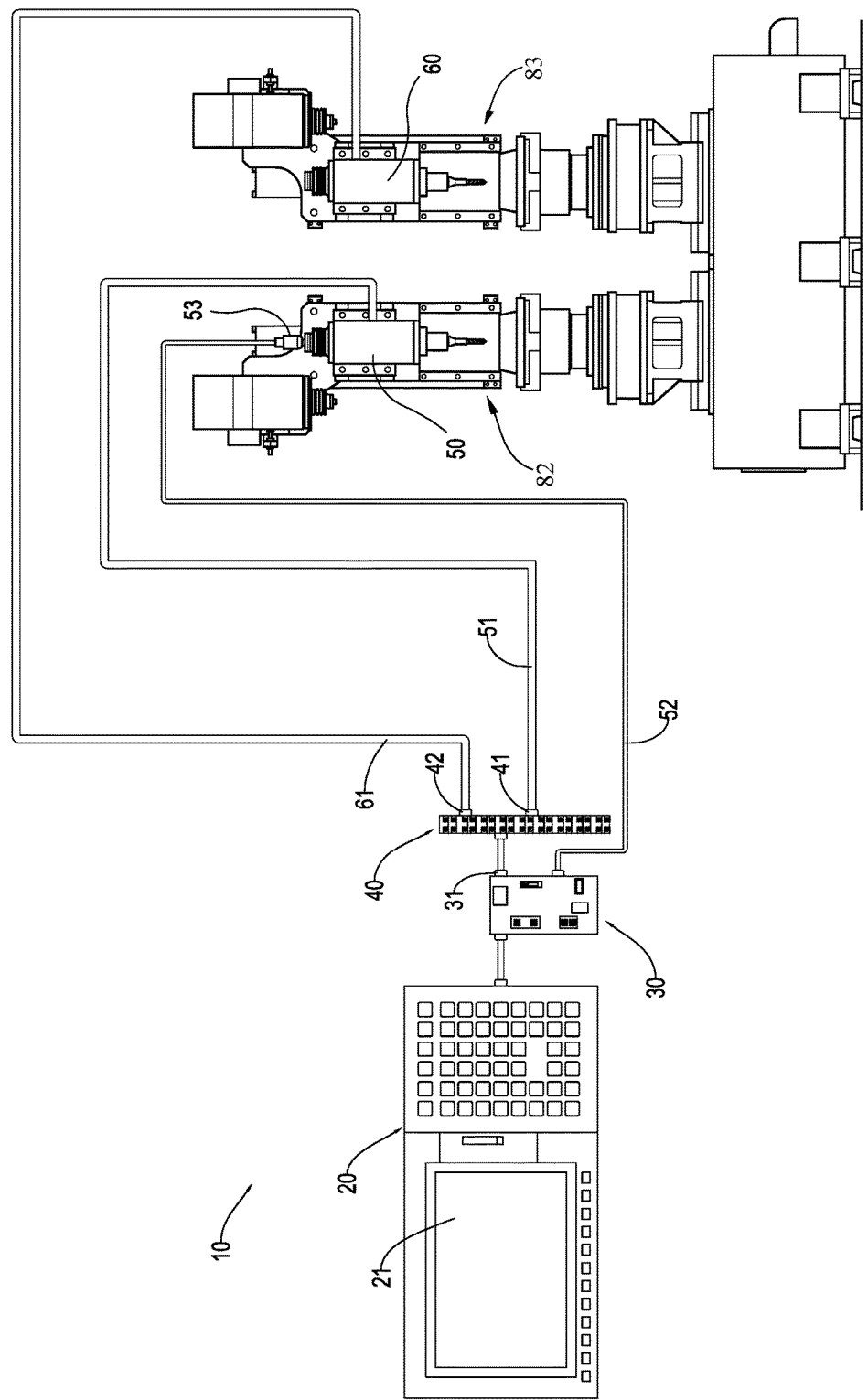
FIG. 1 is a schematic view of a first embodiment of a CNC servo drive system in accordance with the present invention.

With reference to FIG. 1, a computer numerical control (CNC) servo drive system 10 in accordance with the present invention includes a controller 20, a driver 30, a co-connection circuit 40, a first servo motor 50 and a second servo motor 60. The controller 20 receives a user-inputted control command, converts the control command into a control signal, and outputs the control signal. The driver 30 is connected to the controller 20 and has an output terminal 31. After the driver 30 receives and converts the control signal, the output terminal 31 outputs a drive signal and an operating power. The co-connection circuit 40 transmits the drive signal and the operating power and has a first output terminal 41 and a second output terminal 42. The first output terminal 41 and the second output terminal 42 output the drive signal and allocate the operating power.

The first servo motor 50 is connected to the first output terminal 41 through a first power line 51, receives the operating power and the drive signal provided through the first output terminal 41, and makes a motion according to the drive signal to change position, moving speed and positioning accuracy of the first servo motor 50.

The second servo motor 60 is connected to the second output terminal 42 through a second power line 61, receives the operating power and the drive signal provided through the second output terminal 42, and makes a motion according to the drive signal to change position, moving speed and positioning accuracy of the second servo motor 60. The motion performed by the second servo motor 60 is similar to the motion performed by the first servo motor 50.

A sum of a maximum current value of the first servo motor 50 and a maximum current value of the second servo motor 60 is not greater than a maximum current value of the driver 30, such that the driver 30 can simultaneously supply power to the first servo motor 50 and the second servo motor 60 for the first servo motor 50 and the second servo motor 60 to simultaneously operate when the first servo motor 50 and the second servo motor 60 require highest current upon start, instantaneous acceleration, and instantaneous stop thereof.

The maximum current value of the second servo motor 60 is not greater than the maximum current value of the first servo motor 50. To avoid motion delay and unsmooth motion of the first servo motor 50 caused when the second servo motor 60 and the first servo motor 50 operate at their highest rotation speeds and the current consumption of the second servo motor 60 is greater than the current consumption of the first servo motor 50, the first servo motor 50 and the second servo motor 60 may be servo motors of identical specifications and the co-connection circuit can allocate and evenly share the operating power with the first servo motor 50 and the second servo motor 60.

Figure 2:
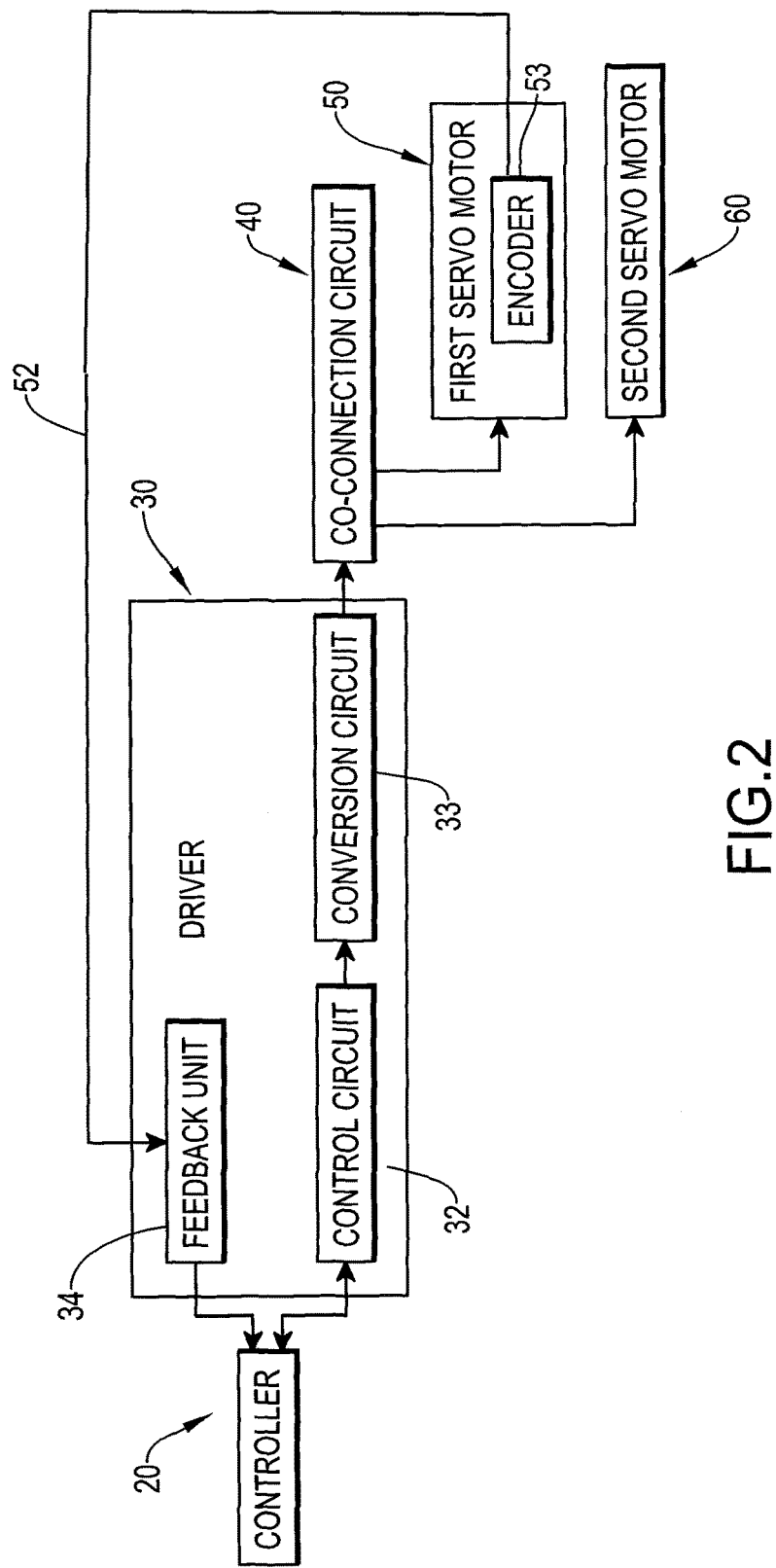
FIG. 2 is a functional block diagram of the CNC servo drive system in FIG. 1.

With reference to FIG. 2, the first servo motor 50 has an encoder 53. The encoder 53 senses operating information of the first servo motor 50, such as position, moving speed and positioning accuracy, and transmits the operating information to the driver 30 through a feedback line 52. The driver 30 transmits the operation information back to the controller 20 for a display unit 21 of the controller 20 to display the operation information for users' awareness of operation of the first servo motor 50. Users further modify the control command according to the operation information, or after receiving the operation information, the driver 30 modifies the drive signal according to the operation information to fine-tune motion of the first servo motor 50 and the second servo motor 60.

The first servo motor 50 and the second servo motor 60 simultaneously perform identical drive signals, such as start, stop and instantaneous acceleration. The second servo motor 60 is connected to a first switch 62. Users can control the first switch 62 to turn on or turn off the first servo motor 60 without having to go through the controller 20.

When users sequentially input a first command, a second command, a third command and a fourth command, the driver 30 drives the first servo motor 50 and the second servo motor 60 to sequentially make motions associated with the first command, the second command, the third command and the fourth command. When performing the second command, if the second servo motor 60 encounters an issue of a tool mounted thereon, users can shut down the first switch 62 to stop operation of the second servo motor 60. Meanwhile, the first servo motor 50 can still perform the second command, the third command and the fourth command. If the tool issue of the second servo motor 60 is eliminated, users can turn on the first switch 62 to restart the second servo motor 60. The first servo motor 50 and the second servo motor 60 can simultaneously perform the second command. When the second servo motor 60 performs the second command, the first servo motor 50 can perform the second command under a state of running idle. After the second servo motor 60 performs the second command, the first servo motor 50 and the second servo motor 60 then simultaneously perform the third command and the fourth command.

With further reference to FIG. 2, the driver 30 further includes a control circuit 32, a conversion circuit 33 and a feedback unit 34. An input terminal of the control circuit 32 is connected to an output terminal of the controller 20. After users input a control command through the controller 20, the controller 20 transmits the control command to the control circuit 32, and the control circuit 32 receives the control command and converts the control command into a drive signal.

The conversion circuit 33 is connected to an output terminal of the control circuit 32 and may be a digital to analog conversion circuit receiving the drive signal provided by the control circuit 32, converting the drive signal in a digital format into an analog drive signal, and connected to the co-connection circuit 40 through the output terminal 31 of the controller 30 for the first servo motor 50 and the second servo motor 60 to operate.

The encoder 53 converts the operation information, such as position, moving speed and positioning accuracy, into a feedback signal that is transmitted to the feedback unit 34 of the driver 30 through the feedback line 52. The feedback unit 34 may be connected to the controller 20 to feed back the feedback signal to the controller 20. Users verify the operation information of the first servo motor 50 by means of the display unit 21 of the controller 20. The feedback unit 34 may be connected to an input terminal of the control circuit 32. After receiving the feedback signal from the feedback unit 34, the control circuit 32 determines if the operation information reflects what the control command inputted by the users precisely intends to achieve. In case of error, the control circuit 32 automatically fine-tunes the drive signal.

The encoder 53 functions to optically, magnetically or mechanically sense, converts sensed information into an electronic signal and outputs the electronic signal to provide the feedback signal. The feedback signal may be a digital signal or an analog signal. When the feedback signal is an analog signal, the feedback unit 34 further has an analog to digital conversion circuit converting the feedback signal into a digital signal to be further provided to the controller 20 or the control circuit 32.

The driver 30 has a power input terminal in connection with a power source, such as mains power or industrial power, converts an input power, such as alternating current (AC) to direct current (DC) conversion or voltage conversion, according to a power requirement of the CNC servo drive system 10, and supplies the converted power to the first servo motor 50 and the second servo motor 60.

The first power line 51 and the second power line 61 may be a three-phase power cable (U, V, W). The output terminal 31 of the driver 30 also has a corresponding three-phase power cable and transmits the drive signal in the form of pulses along with the operating power to the co-connection circuit 40. The co-connection circuit 40 allocates the operating power and transmits the drive signal and the allocated power to the first servo motor 50 and the second servo motor 60 through the first power line 51 and the second power line 61.

Figure 3:
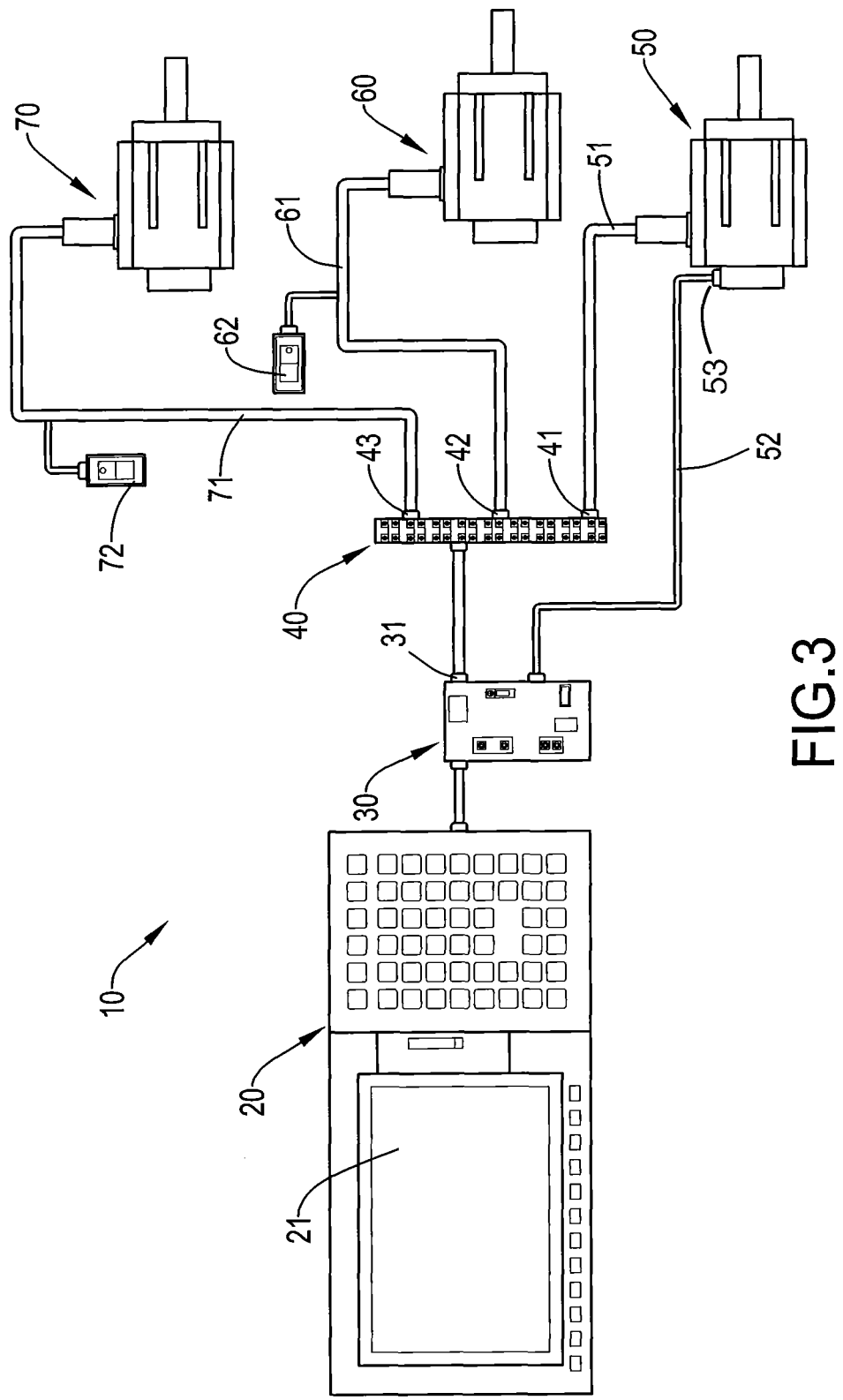
FIG. 3 is a schematic view of a second embodiment of a CNC servo drive system in accordance with the present invention.

With reference to FIG. 3, another embodiment of a CNC servo drive system 10 in accordance with the present invention further includes a third servo motor 70. The third servo motor 70 is connected to a third output terminal 43 through a third power line 71. The third servo motor 70 receives power and the drive signal provided through the third output terminal 43. Thus, the first servo motor 50, the second servo motor 60 and the third servo motor 70 can simultaneously perform the drive signal.

A sum of the maximum current values of the first servo motor 50, the second servo motor 60 and the third servo motor 70 is not greater than the maximum current value of the driver 30, such that the driver 30 can simultaneously provide the maximum current values required by the first servo motor 50, the second servo motor 60 and the third servo motor 70 without incurring issues, such as insufficient power, motion delay, pause or no operation.

The third servo motor 70 has limitations common to those of the second servo motor 60, limiting that the maximum current value of the third servo motor 70 should not be greater than that of the first servo motor 50. When the allocated power of the third servo motor 70 exceeds that of the first servo motor 50 at highest rotation speeds of the first servo motor 50 and the third servo motor 70, the first servo motor 50 may have an issue of motion delay. In the present embodiment, the first servo motor 50, the second servo motor 60 and the third servo motor 70 are servo motors with identical specifications, and the co-connection circuit 40 can evenly allocate power flowing to the first servo motor 50, the second servo motor 60 and the third servo motor 70.

The first servo motor 50, the second servo motor 60 and the third servo motor 70 simultaneously make identical motions. The third servo motor 70 is connected to a second switch 72 for users to directly turn on or turn off the third servo motor 70 through the second switch 72.

When users sequentially input a first command, a second command, a third command and a fourth command, the driver 30 drives the first servo motor 50, the second servo motor 60 and the third servo motor 70 to sequentially perform the first command, the second command, the third command and the fourth command. When performing the third command, if the third servo motor 70 has an issue of a tool mounted thereon, users can stop the third servo motor 70 through the second switch 72. Meanwhile, the first servo motor 50, the second servo motor 60 and the third servo motor 70 still sequentially perform the third command and the fourth command. If the issue of the tool is eliminated when the fourth command is performed, users can turn on the third servo motor 70 through the second switch 72, such that the first servo motor 50, the second servo motor 60 and the third servo motor 70 can simultaneously perform the third command again. When the third servo motor 70 performs the second command, the first servo motor 50 and the second servo motor 60 perform the third command under a state of running idle. After the third servo motor 70 finishes operation corresponding to the third command, the first servo motor 50, the second servo motor 60 and the third servo motor 70 keep simultaneously performing the fourth command.

Figure 4:
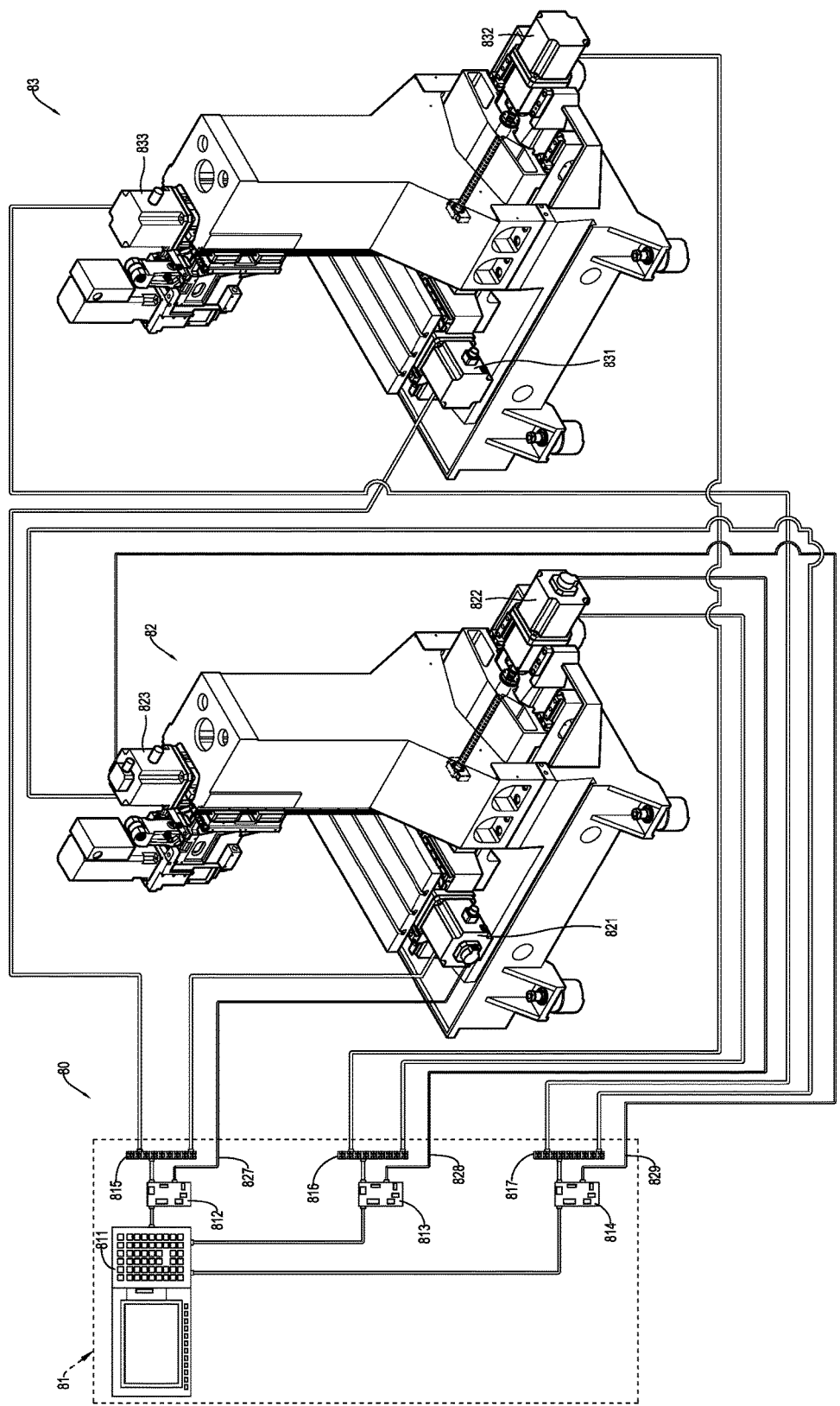
FIG. 4 is a schematic view of machining equipment using the CNC servo drive system in FIG. 1 and FIG. 3.

With reference to FIG. 4, the CNC servo drive system in accordance with the present invention is applied to machining equipment 80. The machining equipment 80 includes a control box 81, a primary machine tool 82 and a secondary machine tool 83. The control box 81 has a controller 811 connected to an X-axis driver 812, a Y-axis driver 813 and a Z-axis driver 814. The X-axis driver 812 controls motion of the machining equipment 80 in the X axis. The Y-axis driver 813 controls motion of the machining equipment 80 in the Y axis. The Z-axis driver 814 controls motion of the machining equipment 80 in the Z axis.

The primary machine tool 82 includes a first X-axis servo motor 821, a first Y-axis servo motor 822 and a first Z-axis servo motor 823. The secondary machine tool 83 includes a second X-axis servo motor 831, a second Y-axis servo motor 832 and a second Z-axis servo motor 833. The X-axis driver 812 is connected to the first X-axis servo motor 821 via a feedback line 827 and the second X-axis servo motor 831 through an X-axis co-connection circuit 815. The Y-axis driver 813 is connected to the first Y-axis servo motor 822 via a feedback line 828 and the second Y-axis servo motor 832 through an Y-axis co-connection circuit 816. The Z-axis driver 814 is connected to the first Z-axis servo motor 823 via a feedback line 829 and the second Z-axis servo motor 833 through an Z-axis co-connection circuit 817.

Users input a control command to the machining equipment 80 through the controller 811. The controller 811 converts the control command into a control signal and transmits the control signal to the X-axis driver 812, the Y-axis driver 813 and the Z-axis driver 814 to drive the first X-axis servo motor 822 and the second X-axis servo motor 831 through the X-axis co-connection circuit 815, drive the first Y-axis servo motor 822 and the second Y-axis servo motor 832 through the Y-axis co-connection circuit 816, and drive the first Z-axis servo motor 823 and the second Z-axis servo motor 833 through the Z-axis co-connection circuit 817. Accordingly, the purpose of using one control box 81 to drive two machine tools (the primary machine tool 82 and the secondary machine tool 83) can be achieved. Instead of two control boxes (including two controllers and six drivers) for two machine tools, one control box (including one controller and three drivers) can drive and control motions of two machine tools in the present invention. The reduction in control box provides advantages of reduced equipment cost, simplified operation, no identical control command required to be repeatedly inputted, and avoidance of human error.

The second X-axis servo motor 831, the second Y-axis servo motor 832 and the second Z-axis servo motor 833 are respectively connected to an X-axis switch 834, a Y-axis switch 835 and a Z-axis switch 836 to turn on/off or pause the second X-axis servo motor 831, the second Y-axis servo motor 832 and the second Z-axis servo motor 833. The X-axis switch 834, the Y-axis switch 835 and the Z-axis switch 836 may be commonly connected to a secondary switch for synchronously turning on/off or pausing the secondary machine tool 83.

The X-axis co-connection circuit 815, the Y-axis co-connection circuit 816 and the Z-axis co-connection circuit 817 may be integrated as a co-connection circuit to simplify the machining equipment 80.

Figure 5:
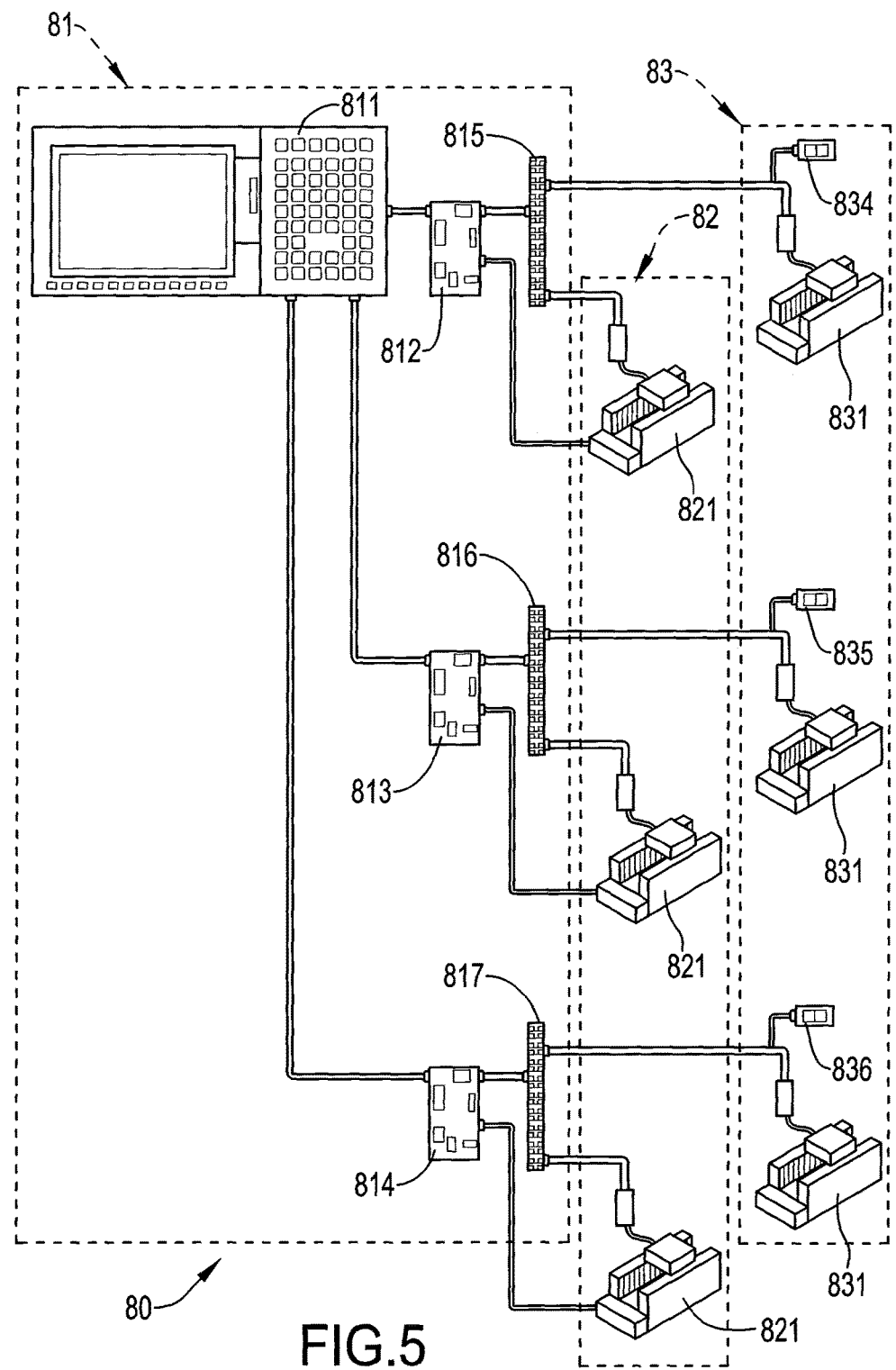
FIG. 5 is a schematic view of machining equipment using a third embodiment of a CND servo drive system implemented with linear motors in accordance with the present invention.
Figure 6:
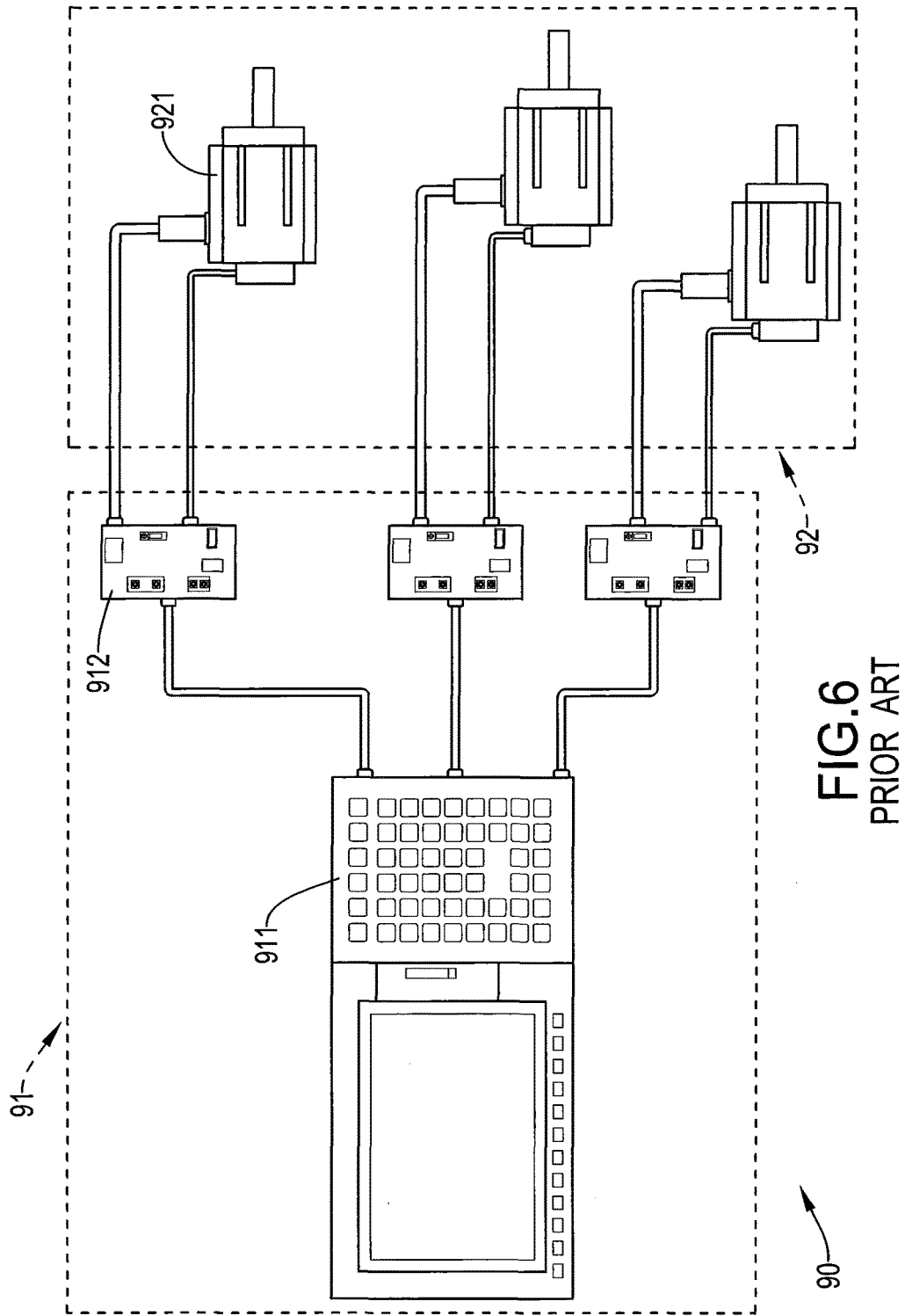
FIG. 6 is a schematic view of a conventional CNC servo drive system.

For all the foregoing embodiments, the multiple servo motors may pertain to one of linear motors, DC motors, permanent magnet AC motors, and induction AC motors. With reference to FIG. 5, a third embodiment of a CNC servo drive system in accordance with the present invention is given as an example of using linear motors as the servo motors.

In sum, the CNC servo drive system in accordance with the present invention drives a first servo motor and a second servo motor through one driver and one co-connection circuit. Given one driver, the CNC servo drive system can drive multiple servo motors to enhance power utilization efficiency at work. The presence of the switch for turning on/off the second servo motor can turn on/off the second servo motor at any time during a machining process. Supposing that the second servo motor experiences tool bump and a timely shutdown is made, the first servo motor can still operate. After the issue of tool bump is eliminated, the second servo motor can be directly turned on for further machining operation. Meanwhile, the first servo motor performs a completed machining process under a state of running idle. After the second servo motor completes the unfinished machining process due to the tool bump, the first servo motor and the second servo motor can continuously complete the remaining machining operation without additional input of control command, thereby increasing the machining efficiency.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. Machining equipment combined with a computer numerical control (CNC) servo drive system, comprising a control box, a primary machine tool, and a secondary machine tool;

the control box comprising a controller, the controller adapted to receive a user-inputted control command, converting the control command into a control signal, and outputting the control signal; the controller being connected to an X-axis driver, a Y-axis driver, and a Z-axis driver, the X-axis driver controlling motions of the primary machine tool and the secondary machine tool in an X axis, the Y-axis driver controlling motions of the primary machine tool and the secondary machine tool in a Y axis, the Z-axis driver controlling motions of the primary machine tool and the secondary machine tool in a Z axis;

the primary machine tool comprising a first X-axis servo motor, a first Y-axis servo motor, and a first Z-axis servo motor; the secondary machine tool comprising a second X-axis servo motor, a second Y-axis servo motor, and a second Z-axis servo motor;

wherein the X-axis driver is connected to the first X-axis servo motor and the second X-axis servo motor through an X-axis co-connection circuit; the Y-axis driver is connected to the first Y-axis servo motor and the second Y-axis servo motor through an Y-axis co-connection circuit; and the Z-axis driver is connected to the first Z-axis servo motor and the second Z-axis servo motor through an Z-axis co-connection circuit;

wherein a sum of consumptions of maximum current values of the first X-axis servo motor and the second X-axis servo motor is not greater than a maximum current value outputted from the X-axis driver; a sum of consumptions of maximum current values of the first Y-axis servo motor and the second Y-axis servo motor is not greater than a maximum current value outputted from the Y-axis driver; and a sum of consumptions of maximum current values of the first Z-axis servo motor and the second Z-axis servo motor is not greater than a maximum current value outputted from the Z-axis driver; and wherein the consumption of maximum current value of the second X-axis servo motor is not greater than the first X-axis servo motor; the consumption of maximum current value of the second Y-axis servo motor is not greater than the first Y-axis servo motor; and the consumption of maximum current value of the second Z-axis servo motor is not greater than the first Z-axis servo motor.

2. The machining equipment combined with a CNC servo drive system as claimed in claim 1, wherein the X-axis driver comprises a feedback unit and the first X-axis servo motor comprises an encoder, the encoder of the first X-axis servo motor being connected to the feedback unit of the X-axis driver through a feedback line; the Y-axis driver comprises a feedback unit and the first Y-axis servo motor comprises an encoder, the encoder of the first Y-axis servo motor being connected to the feedback unit of the Y-axis driver through a feedback line; and the Z-axis driver comprises a feedback unit and the first Z-axis servo motor comprises an encoder, the encoder of the first Z-axis servo motor being connected to the feedback unit of the Z-axis driver through a feedback line.

* * * * *